Dec. 4, 1945.  E. H. HART  2,390,301
PNEUMATIC TELEMETERING SYSTEM
Filed Jan. 16, 1942  2 Sheets-Sheet 1

TRANSMITTER

INVENTOR.
EUGENE H. HART
BY
E.C. Sanborn
Attorney

Dec. 4, 1945. E. H. HART 2,390,301
PNEUMATIC TELEMETERING SYSTEM
Filed Jan. 16, 1942 2 Sheets-Sheet 2

INVENTOR
EUGENE H. HART.
BY E. C. Sanborn
ATTORNEY

Patented Dec. 4, 1945

2,390,301

UNITED STATES PATENT OFFICE 2,390,301

PNEUMATIC TELEMETERING SYSTEM

Eugene H. Hart, Waterbury, Conn., assignor to The Bristol Company, Waterbury, Conn., a corporation of Connecticut Application January 16, 1942, Serial No. 426,941

9 Claims. (Cl. 73—388)

This invention relates to fluid pressure operated telemetering systems and more especially to means for rendering a system of this class adaptable to the transmission to a central station of measurements performed at a plurality of more or less diverse points.

It is an object of this invention to provide a telemetering system of the pneumatic type in which the pressure of air applied to an indicating or recording receiving instrument may be made to correspond with that developed in any selected one of a plurality of transmitting instruments.

It is a further object to provide means whereby the selection of the particular transmitting instrument which it is desired to associate with the receiver may be remotely effected by electrical means or locally effected by the use of a multi-port valve.

It is a further object to provide means whereby the selection of transmitting instruments to be successively associated with a receiving instrument may be carried out automatically, either according to a cycle represented by a progressive advance from one transmitter to another individually upon the attainment of a predetermined condition, or according to a predetermined cycle upon the attainment of said condition, or according to a continuously repetitive cycle.

In carrying out the purposes of the invention it is proposed to utilize the principles of a pneumatic telemetering system wherein a transmitting instrument provided with a sensitive element responsive to changes in a magnitude to be measured, and remotely indicated or recorded, is caused to regulate the pressure of air or other elastic fluid in a conduit so that said pressure will at all times be a measure of the value of said magnitude. Such instruments are available in a variety of forms and are compensated for variations in supply pressure and other possible sources of error. The receiving instrument for such a system embodies the elements of a pressure gauge which latter may be made in either an indicating or a recording form. Such a system of telemetering and the instrumentalities by which its purposes may be carried out are fully set forth and described in British Letters Patent No. 525,674, issued to the applicant's assignee on September 2, 1940.

The nature of the invention, however, will best be understood when described in connection with the accompanying drawings in which.

Figure 1:
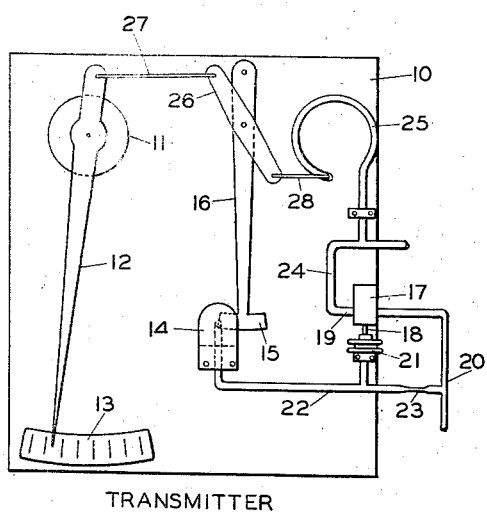
Fig. 1 is a diagrammatic representation of a transmitting instrument suitable for use in a system embodying the principles of the invention.

Referring now to the drawings: In Fig. 1, the numeral 10 designates a base-plate upon which are mounted the several elements comprising a transmitting instrument. A primary measuring unit 11 carries an indicating pointer 12 adapted to deflect in response to changes in the magnitude of the condition to be measured and to provide on a graduated scale 13 a direct indication of said magnitude. Also mounted upon the plate 10 is an orifice member 14, having in cooperative association therewith a vane element 15 carried upon an extended arm 16, pivotally mounted upon the base-plate 10 at the extremity of the arm remote from said vane member. The relative positioning and interaction of the vane and orifice members is such that a very small movement of the vane with respect to the orifice may produce a large change in the equivalent opening of said orifice and a correspondingly large change in back pressure of air or other pressure fluid escaping therefrom.

Mounted upon the base-plate 10 is a three-way valve of the supply-and-waste type having a body portion 17 and a stem portion 18, providing for a port 19 alternative communication with a supply of pressure fluid 20 or with the external atmosphere, according to its deflected position relative to the body portion. A capsular spring or bellows member 21, subject to longitudinal deflection with changes in internal fluid pressure is positioned on the base-plate 10 for operative engagement with the stem member 18. The arrangement is such that increase of pressure within the bellows 21 tends to operate the valve in a sense to impede the supply of pressure fluid to the port 19 from the supply 20 and at the same time to place said port in freer communication with the atmosphere, thus tending to lower the pressure at the port 19 and in any closed system which may be connected therewith.

A conduit 22 affords free communication between orifice unit 14 and the bellows member 21, and, through a constriction 23, with the source 20 of fluid, preferably compressed air, at a moderate pressure. Changes in back-pressure, due to the vane 15 in its movements more or less obstructing the escape of pressure fluid from the orifice unit 14 in relation to the resistance opposed to passage of pressure fluid through the constriction 23, thus will be communicated to the bellows member 21 and render the effect of the valve 17 subject to the position of the vane 15.

Connected to the port 19 of this valve is a closed system including a conduit 24 which extends from the transmitting instrument to the point where remote measurement is required. A Bourdon spring 25 of the conventional type and mounted on base-plate 10 is in communication with the conduit being adapted to deflect in response to changes in the pressure of the fluid therein.

A vertically extended floating lever member 26 having three pivot bearings, one at each extremity and one intermediately located, is pivotally mounted by the latter bearing upon the arm 16 at a point intermediate the vane member 15 and the point of pivoting of said arm upon the base-plate 10. The upper extremity of the floating lever is operatively attached by means of a link 27 to the deflecting arm 12, while the lower extremity is attached by means of a link 28 to the free end of the Bourdon spring 25.

With the connections made as shown in Fig. 1, it will be apparent that upon deflection of the pointer 12 in response to a change in the value of the condition as measured upon the scale 13 by the element 11, for example to the right, the upper end of the floating lever 26 will be deflected toward the left. The vane 15 will be similarly deflected, tending to obstruct the outlet of the orifice member 14 and retard the escape of air therefrom. The pressure within the conduit 22 being subject to the escape of air relative to its supply through the constriction 23, will tend to rise, which increase of pressure, being communicated to the bellows member 21, will cause said bellows to expand. This effects movement of the stem 18 of the three-way valve in a sense to cut off the admission of air from the supply 20, and to increase the vent to the atmosphere, with a consequent lowering of pressure in the closed conduit 24 and all parts of the system in communication therewith. This reduction of pressure, being communicated to the Bourdon spring 25, will cause its free end to be deflected toward the right, setting through the link 28 to move the lower end of the floating lever 26 in the same direction, tending to annul the original motion of the vane 15 toward the left.

In a similar manner, the result of a deflection of the pointer 12 toward the left, and a consequent movement of the vane 15 toward the right, will be to lower the pressure in the bellows 21. This will cause the pressure in the conduit 24 to be increased, deflecting the free end of the Bourdon spring 25 toward the left, similarly moving the lower end of the lever 26 and the vane 15, and establishing a balance with a new value of pressure in the conduit 24. Thus, the tendency of the device will be to establish and maintain at all times a condition of balance with the edge of the vane 15 at a point with respect to the orifice member 14 where the resulting pressure in the bellows 21 will cause the valve 17 to be maintained in a condition to hold in the conduit 24 a fluid pressure which shall bear a definite relation to the position of the indicator 12 in regard to the scale 13.

The receiving instrument may take the form of a pressure gauge of any conventional type and may be adapted to provide its ultimate measurement either in the form of an indication or a record. The receiving instrument is connected to conduit 24 of the transmitting instrument; and since the only flow of pressure fluid through said conduit is that which takes place upon a change in the pressure established therein by the transmitting instrument, the conduit may be of an extremely small bore and yet provide an effective pressure measurement at the receiving instrument.

Figure 2:
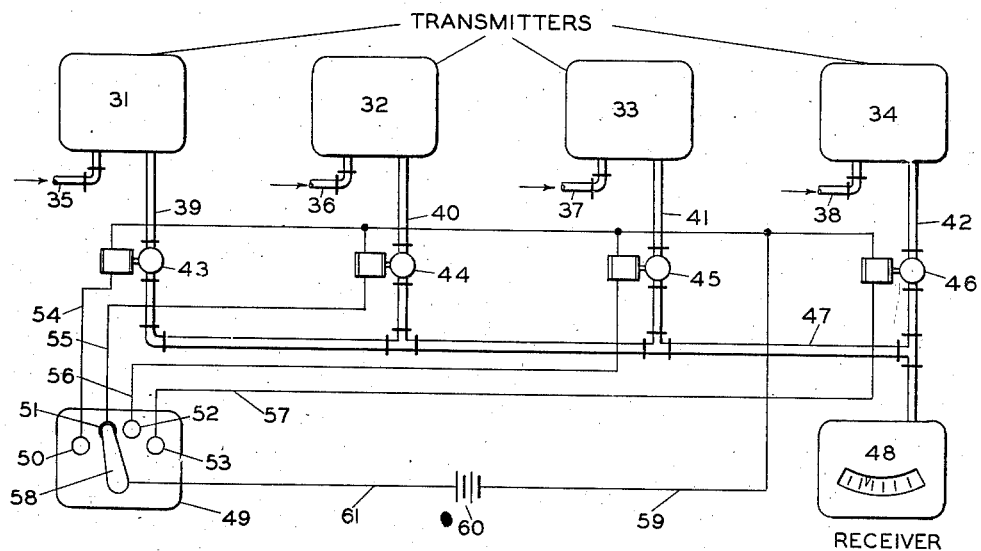
Fig. 2 is a diagrammatic representation of a multiple-point telemetering system embodying the principles of the invention.

In Fig. 2 is shown an arrangement whereby a single receiving instrument may be selectively placed in operative connection with any one of four transmitting instruments 31, 32, 33 or 34, of the type hereinbefore set forth, situated at points more or less remote from each other and from the receiver. The transmitters are connected each to receive a supply of air, as from sources 35, 36, 37 and 38, or from a common source if expedient, and to modify the pressures in outlet conduits 39, 40, 41 and 42 respectively, in accordance with changes in values measured by said transmitters. The four conduits 39, 40, 41 and 42 are connected through electrically actuated valves 43, 44, 45 and 46 respectively to a common conduit 47, which in turn leads to a receiving instrument 48, which may take the form of an indicating or recording pressure gauge, having a scale calibrated in terms of the magnitudes under measurement by the transmitting instruments.

A dial switch 49, having contact elements 50, 51, 52 and 53, connected to one side of each of the respective electrically actuated valves 43, 44, 45 and 46 respectively, by corresponding conductors 54, 55, 56 and 57, carries also a switch arm 58 adapted to provide electrical connection with any one of said contact elements. The free terminals of the electrically actuated valves are connected by means of a common conductor 59 to one terminal of a source of electrical energy 60 and the other terminal of said source by a conductor 61 to the switch arm 58 of the dial switch 49.

The several valves being so arranged as to be opened upon electrical energization and closed upon deenergization, it will be seen that with the switch arm 58 brought into engagement with a selected one of the contact elements in the dial switch, the corresponding valve in the piping system will be energized and opened, and the receiving instrument made responsive to pressure variations controlled by the corresponding transmitter. For example, with the switch arm set on the contact element 51, the valve 44 will be opened, and the receiver 48 made responsive to pressure values in the conduit 40, thus to provide a remote indication or record of quantities determined by the transmitting instrument 32.

Figure 3:
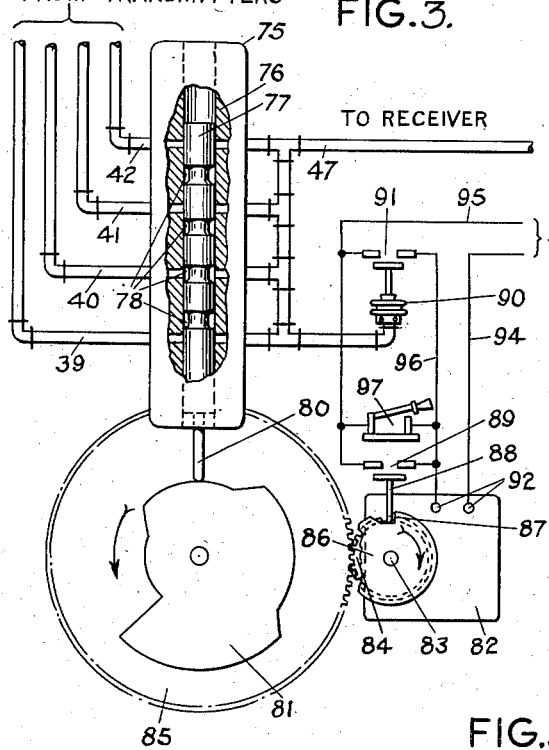
Fig. 3 is a representation of motor-driven valve means whereby selection of transmitters may be automatically carried out according to a predetermined cyclical schedule.

In Fig. 3 is shown apparatus whereby selective action may be made automatically to carry out a cycle whereby respective transmitting instruments are successively connected to a single receiving instrument according to any one of several desired cycles. A transfer valve 75, of the piston type, comprises an elongated body portion 76 axially bored therethrough and having four spaced ports communicating respectively with the conduits 39, 40, 41 and 42, which in turn are connected to the several transmitting instruments as shown in Fig. 1. Corresponding ports are provided with a common connection to the conduit 47. A piston or plunger 77 adapted to be moved longitudinally within the bore of the body part 76 is provided with circumferential grooves 78 spaced evenly therealong but differently to the spacing between the ports in the body part. The spacing of the grooves 78 is related to that of said ports in such a manner that as the plunger 77 is moved longitudinally within the body part 76 the conduits 39, 40, 41 and 42 will be selectively and one at a time placed in communication with the conduit 47 according to the longitudinal position of said plunger. Thus by a longitudinal movement of the plunger 77 a selected one of the several transmitting instruments may be placed in operative association with the single receiver.

The plunger 77 is provided with a stem 80 adapted to engage the surface of a cam 81 having four distinct dwells, whereby the longitudinal position of the plunger 77 will depend upon the angular position of the cam 81. An electric motor 82 having a shaft 83 is adapted to drive the cam 81 through a train consisting of two operatively engaging gears 84 and 85, the former being fixed to the shaft 83 and the latter to the cam 81. As shown in the drawings the gear 85 is made of four times the diameter of the gear 84, so that upon one revolution of the shaft 83 the cam 81 will be advanced ¼ of a revolution and the plunger 77 will be shifted sufficiently far to change the communication of the receiving instrument from one to another of the transmitting instruments. Mounted upon the shaft 83 is a cam 86 having in its contour a single notch 87. A cam follower 88 is adapted to engage the contour of cam 86 and to actuate electrical contacts 89 in a sense to close said contacts when said follower rests upon the periphery of the cam 86 and to open the same when said follower rests within the notch 87. Connected to the conduit 47 is a capsular spring or bellows 90 adapted to actuate electrical contacts 91 in a sense to close said contacts upon the attainment of a predetermined fluid pressure within said bellows and to open said contacts when pressure within said bellows falls below the predetermined value. A pair of terminals 92 upon said motor 82 provide connection between its internal windings and an outside circuit in such a manner that when electrical energy is applied to said terminals the shaft 83 of said motor will rotate in a clockwise sense. From one side of a source of electrical supply 93 a conductor 94 is directly connected to one of the terminals 92. From the other side of said source of electrical energy a conductor 95 is connected to one side of each of the contacts 89 and 91. A conductor 96 is connected to the other side of each of said contacts 89 and 91 and to the other one of said terminals 92. A manually operable switch 97 is connected between conductors 95 and 96.

In operation the device as shown in Fig. 3 performs in the following manner: the elements of the mechanism are shown in a position where the conduit 40 and the corresponding transmitter are in communication with the conduit 47 and the receiving instrument. The cam follower 88 rests in the notch 87 on the cam 86, maintaining an open circuit at the contacts 89. Pressure in the bellows 90 is below the predetermined critical value, whereby an open circuit is maintained at the contacts 91. The switch 97 is standing open. Under this condition there is no complete circuit between the source of electrical energy 93 and the motor 82, so that said motor remains at rest. Pressure in the conduit 40, and therefore in the conduit 47, is controlled by the transmitting instrument with which these conduits communicate, and so long as this pressure does not exceed the set value of the bellows 90, the receiving instrument will continue to provide a measure of the magnitude determined by the transmitting instrument connected to conduit 40. Upon the pressure in conduit 47 exceeding the set value of the bellows 90 the contact 91 will be closed, completing a circuit through conductors 95, 96 and 94 to the motor 82 and causing the shaft 83 to be rotated and the cam 81 to be placed in motion. Immediately upon the cam 86 commencing to rotate, the cam follower 88 will rise to the periphery of the cam and will close the contacts 89, thus maintaining the motor 82 in operation without respect to changes in pressure in the bellows 90. The shaft 83 of the motor 82 will thus continue to rotate for one complete revolution and will cause the cam 81 to be rotated through ¼ of a revolution, moving the plunger 77 to an extent to shift connection of the conduit 47 from the conduit 40 to the conduit 41, thus substituting the transmitting instrument connected to the latter conduit for that connected to the former conduit.

If the pressure derived from the conduit 41 and communicated to the conduit 47 is less than the set value of the bellows 90, the contacts 91 will be opened; and upon the completion of one revolution of the shaft 83 and the cam 86 the follower 88 will drop into the notch 87, opening the contacts 89 and bringing the motor to rest, thus completing the cycle of shifting one transmitter to another in the telemetering system. The system as above described is suited to an installation where the operating pressures in the conduits 40, 41, etc., tend to increase from a low value to a high value during a cycle of operation. It will be apparent that by replacing the normally open bellows-actuated contact 91 by a form adapted to close on low pressure and be opened by a high pressure, the system will be rendered applicable to an installation characterized by progressively decreasing pressure values.

As hereinbefore pointed out, the gears 84 and 85 as shown in the drawings are made with a 1/4 ratio, or in general, a ratio such that one revolution of the motor shaft 83 will shift the connection of the receiver from one transmitter to another and will then allow the transfer valve to come to rest. By substituting gears having a 1/1 ratio for gears having a 4/1 ratio, the cam 81 will be caused to rotate at the same speed as the shaft 83, so that the complete cycle as determined by the cam 86 will involve connecting in turn each of the several transmitting instruments to the receiver. Thus, upon the attainment of the predetermined pressure in the conduit 47, the motor 82 will automatically make a "survey" of the pressures developed by the several transmitting instruments, allowing each of these to affect the receiver for a time, and will then restore the connection to the original instrument. It will be obvious that by the selection of other gear ratios and other cam arrangements a variety of cycles of operation may be obtained.

By closing the switch 97, and thereby bridging the contacts 89 and 91, the motor 82 will be caused to operate continuously, so that the transfer of the receiving instrument from one transmitter to another will be continuous and the measurements as determined by the several transmitters will be successively and periodically determined by the receiver.

Figure 4:
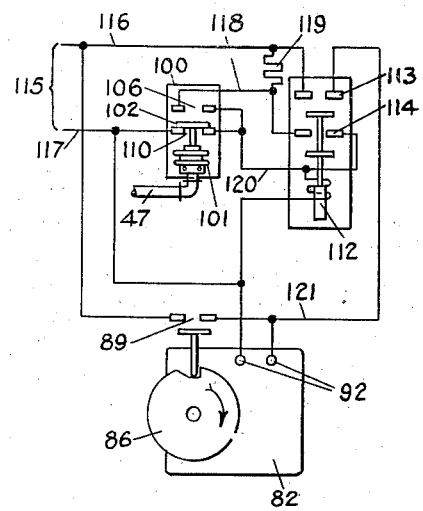
Fig. 4 is the diagram of an electrical circuit which may alternatively be used with the embodiment of the invention shown in Fig. 3.
Figures 5, 6:
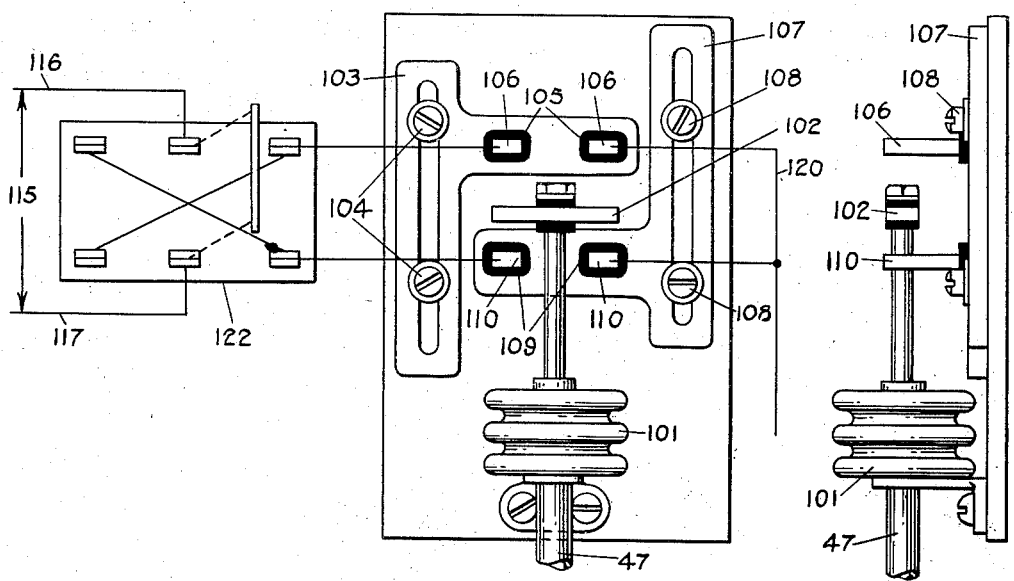
Figs. 5 and 6 are front and side elevations, respectively, of a fluid-pressure actuated electrical contactor which may effectively be used with some forms of the invention.

In Figs. 4, 5 and 6 are shown electrical apparatus and circuits which may be utilized instead of the electrical system shown in Fig. 3, with a view to rendering the motor 82 operating the transfer valve 75 responsive to conditions differing from those by which the apparatus shown in Fig. 3 is normally adapted to be actuated. The motor 82 and the cam 86 driven thereby, together with the contacts 89 and operating means therefor, are identical with the corresponding elements shown in Fig. 3. The bellows 90 of Fig. 3, with its single pair of electrical contacts, is replaced by a pressure-switch 100, shown in detail in Figs. 5 and 6, having an operating bellows, capsular spring, or the equivalent, 101, adapted to be longitudinally deformed in response to changes in fluid pressure therein. Carried by the bellows member 101, but insulated therefrom, and adapted to be moved by deflection thereof is an insulated contacting member 102. Slidably mounted on the base of the switch 100 is a bracket 103 adapted for adjustment in the direction of travel of the contacting member 102 and to be secured to said base in any desired adjusted position, as by screws 104. Carried by the bracket 103, but insulated therefrom, as by insulating blocks 105, are contacts 106 adapted to be engaged and bridged by the contacting member 102 as said member attains the high limit of its excursion corresponding to a predetermined maximum pressure within the bellows 101. Slidably mounted on the base of the switch 100 is a bracket 107 adapted for adjustment in a sense similarly to the bracket 103, but independently thereof and to be secured to the base as by screws 108; and carried by the bracket 107, and insulated therefrom as by insulating blocks 109, are contacts 110 adapted to be engaged and bridged by the contacting member 102 as said member attains the low limit of its excursion corresponding to a predetermined minimum pressure within the bellows member 101. By virtue of the independently adjustable features of the brackets 103 and 107, the maximum and minimum operating limits of operation of the pressure switch 100 may be independently adjusted. It will be understood that the contacts 91, shown in Fig. 3, are adjustable in a manner similar to the contacts 106 herein described.

A relay 112 (see Fig. 4) is adapted when energized to close two sets of contacts 113 and 114, and when de-energized to open both said sets of contacts. A source of electrical power 115 is represented by two conductors 116 and 117. Conductor 116 is connected to one side of each of the contacts 113 and 89. Conductor 117 is connected to one side of contact 110 of the pressure switch 100, to one of the two terminals 92 on the motor 82, and to one side of the operating coil of relay 112. A conductor 118 connects one side of contact 106 to one side of contact 114, and is also tied to conductor 116 through a resistor 119. The free sides of contacts 106 and 110 are tied together by means of a conductor 120 which is connected also to the free side of contact 114 and to the free end of the operating coil of relay 112. The free sides of contacts 89 and 113 are connected to each other and to the remaining one of the terminals 92 on the motor 82 by means of a conductor 121. If desired, a reversing switch 122 may be interposed between the contacts of the pressure-switch 100 and the conductors 116 and 117, as shown in Fig. 5, so that the connections of the contacts 106 and 110 to conductors 116 and 117 may be interchanged.

A typical cycle of operation of the apparatus illustrated in Fig. 4 may be taken as follows: assuming first that pressure in the conduit 47 and bellows 101 is low, and that the motor 82 has come to rest with the cam 86 in the position shown wherein the contact 89 is open, the relay 112 will be de-energized and will stand with its contacts 113 and 114 both open; and there will be no complete circuit between the source 115 and the terminals 92 of the motor 82. The plunger 77 of the transfer valve 75 (as shown in Fig. 3) will thus remain at rest, and the receiving instrument will provide a measure of conditions as determined by the transmitting instrument whose interconnecting conduit is at that time in communication with the conduit 47. This condition will continue until pressure in the conduit 47 and in the bellows 101 rises to a value where contacts 110 are opened and contacts 106 closed. Upon closing of the contacts 106, a circuit is completed from the conductor 116 through the resistor 119, the conductor 118, the contacts 106, the conductor 120, and the winding of relay 112 to the conductor 117, thus energizing said relay. The closing of the contacts of the relay 112 effects two purposes. Completion of the circuit at contacts 114 serves to bridge the contacts 106, and thus to lock the relay in its energized position whether or not said contacts 106 remain closed. Closing of the contacts 113 connects conductor 121 to conductor 116, thus permitting voltage to be applied to the terminals 92 of the motor 82, causing said motor to rotate the cam 86 and all other elements operated by the motor. Immediately upon the commencement of rotation of cam 86, the contacts 89 will be closed, thus bridging the contacts 113 of the relay 112 and rendering it impossible for the motor 82 to be de-energized with the cam 86 in any position other than that from which it started. So long as the relay 112 remains energized the motor 82 will continue to operate; and should said relay become de-energized, opening the contacts 113, said motor will continue to operate until the cam 86 comes to its starting position, causing the circuit to the motor to be broken at the contacts 89. There is thus established a definite stopping position for the motor 82, so that the transfer valve operated thereby can be brought to rest only in one of its definite settings and not in any intermediate position. By virtue of the completion of the circuit through locking contacts 114, de-energization of the relay 112 will not be effected upon the opening of the contacts 106 due to a lowering of pressure within the bellows 101 below the value established by the setting of the contacts 106 as positioned by the adjustable bracket 103. In order for the relay 112 to become de-energized, it is necessary that the pressure within the bellows 101 fall to a value corresponding to the setting of the contacts 110 as positioned by the adjustable bracket 107. Upon closing of the contacts 110, the conductor 120 will be directly connected to conductor 117, thus short-circuiting the winding of relay 112, and momentarily allowing current to flow from conductor 116 through resistance 119, conductor 118, contacts 114, conductor 120, and contacts 110, to conductor 117. Upon de-energization of the winding of relay 112 due to its short-circuiting by contacts 110, the armature of said relay will be released and contacts 113 and 114 both opened. The opening of contacts 114 will break the circuit through which resistance 119 was momentarily connected across the supply; and the opening of contacts 113 will interrupt the supply of current to the motor 82, except in so far as contacts 89, bridging contacts 113, may still continue to carry current, which condition, as hereinbefore set forth, will be maintained until contacts 89 are opened by the cam 86 and the motor 82 brought to rest in a predetermined position. Thus, with the control circuit shown in Fig. 4 there is provided an arrangement whereby the transferring of the receiving instrument selectively from one transmitter to another may be initiated upon the pressure applied to said receiving instrument exceeding an adjustable predetermined value, and may be terminated upon said pressure decreasing until it attains another adjustable predetermined minimum value; and by use of the reversing switch 122 as hereinbefore set forth, the functions of the contacts 105 and 110 may be interchanged, so that initiation of the transfer cycle will take place upon the attainment of a predetermined minimum pressure, and termination of said cycle upon the attainment of a predetermined maximum pressure. Other combinations of starting and stopping functions which may be effected without departing from the spirit of the invention will suggest themselves to those versed in the art.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a fluid-pressure-actuated telemetering system: the combination of a plurality of transmitting instruments each of which is adapted to control a fluid pressure in correspondence with a measured magnitude, a single pressure-sensitive receiving instrument, conduit means adapted to connect said transmitting instruments to said receiving instrument, valve means adapted selectively to provide operative communication through said conduit means between said receiving instrument and any one of said transmitting instruments, power-operated means for actuating said valve means through a cycle whereby said receiving instrument is rendered responsive to said transmitting instruments in a predetermined succession, and pressure-sensitive means for controlling the operation of said power-operated means in response to changes in said fluid pressure.

2. In a fluid-pressure-actuated telemetering system: the combination of a plurality of transmitting instruments each of which is adapted to control a fluid pressure in correspondence with a measured magnitude, a single pressure-sensitive receiving instrument, conduit means adapted to connect said transmitting instruments to said receiving instrument, valve means adapted selectively to provide operative communication through said conduit means between said receiving instrument and any one of said transmitting instruments and power-operated means for actuating said valve means through a cycle whereby said receiving instrument is rendered responsive to said transmitting instruments in a predetermined succession together with means responsive to the attainment of a predetermined value by one of said magnitudes, to control a supply of power to said power-operated means.

3. In a fluid-pressure-actuated telemetering system: the combination of a plurality of transmitting instruments each of which is adapted to control a fluid pressure in correspondence with a measured magnitude, a single pressure-sensitive receiving instrument, conduit means adapted to connect said transmitting instruments to said receiving instrument, valve means adapted selectively to provide operative communication through said conduit means between said receiving instrument and any one of said transmitting instruments and power-operated means for actuating said valve means through a cycle whereby said receiving instrument is rendered responsive to said transmitting instruments in a predetermined succession together with means responsive to the attainment of a predetermined pressure in said conduit means to control a supply of power to said power-operated means.

4. In a fluid-pressure-actuated telemetering system: the combination of a plurality of transmitting instruments each of which is adapted to control a fluid pressure in correspondence with a measured magnitude, a single pressure-sensitive receiving instrument, conduit means adapted to connect said transmitting instruments to said receiving instrument, valve means adapted selectively to provide operative communication through said conduit means between said receiving instrument and any one of said transmitting instruments and power-operated means for actuating said valve means through a cycle whereby said receiving instrument is rendered responsive to said transmitting instruments in a predetermined succession, together with means responsive to the attainment of a predetermined value by one of said magnitudes to initiate the operation of said power-operated means, and means responsive to the attainment of a predetermined value by one of said magnitudes to terminate said operation.

5. In a fluid-pressure-actuated telemetering system: the combination of a plurality of transmitting instruments each of which is adapted to control a fluid pressure in correspondence with a measured magnitude, a single pressure-sensitive receiving instrument, conduit means adapted to connect said transmitting instruments to said receiving instrument, valve means adapted selectively to provide operative communication through said conduit means between said receiving instrument and any one of said transmitting instruments and power-operated means for actuating said valve means through a cycle whereby said receiving instrument is rendered responsive to said transmitting instruments in a predetermined succession together with means responsive to the attainment of a selected pressure value in said conduit means to initiate the operation of said power-operated means, and means responsive to the attainment of another selected pressure value in said conduit means to terminate said operation.

6. In a fluid-pressure-actuated telemetering system: the combination of a plurality of transmitting instruments each of which is adapted to control a fluid pressure in correspondence with a measured magnitude, a single pressure-sensitive receiving instrument, conduit means adapted to connect said transmitting instruments to said receiving instrument, valve means adapted selectively to provide operative communication through said conduit means between said receiving instrument and any one of said transmitting instruments and power-operated means for actuating said valve means through a cycle whereby said receiving instrument is rendered responsive to said transmitting instruments in a predetermined succession together with pressure-sensitive means responsive to the attainment of a predetermined value by one of said magnitudes, to control a supply of power to said power-operated means.

7. In a fluid-pressure-actuated telemetering system: the combination of a plurality of transmitting instruments each of which is adapted to control a fluid pressure in correspondence with a measured magnitude, a single pressure-sensitive receiving instrument, conduit means adapted to connect said transmitting instruments to said receiving instrument, valve means adapted selectively to provide operative communication through said conduit means between said receiving instrument and any one of said transmitting instruments and power-operated means for actuating said valve means through a cycle whereby said receiving instrument is rendered responsive to said transmitting instruments in a predetermined succession, together with pressure-sensitive control means responsive to the attainment of a predetermined value by one of said magnitudes to initiate the operation of said power-operated means, and means responsive to the attainment of a predetermined value by one of said magnitudes to terminate said operation.

8. In a fluid-pressure-actuated telemetering system: the combination of a plurality of transmitting instruments each of which is adapted to control a fluid pressure in correspondence with a measured magnitude, a single pressure-sensitive receiving instrument, conduit means adapted to connect said transmitting instruments to said receiving instrument, valve means adapted selectively to provide operative communication through said conduit means between said receiving instrument and any one of said transmitting instruments and power-operated means for actuating said valve means through a cycle whereby said receiving instrument is rendered responsive to said transmitting instrument in a predetermined succession together with pressure-sensitive control means responsive to the attainment of a selected pressure value in said conduit means to initiate the operation of said power-operated means, and means responsive to the attainment of another selected pressure value in said conduit means to terminate said operation.

9. In a fluid-pressure-actuated telemetering system: the combination of a plurality of transmitting instruments each of which is adapted to control a fluid pressure in correspondence with a measured magnitude, a single-pressure-sensitive receiving instrument, conduit means adapted to connect said transmitting instruments to said receiving instrument, electric motor means, valve means actuated thereby upon energization thereof selectively to provide operative communication through said conduit means between said receiving instrument and any one of said transmitting instruments, and means responsive to the attainment of a predetermined condition in said system for energizing said motor means.

EUGENE H. HART.